9283X

A. TIERS.

Car Wheel.

Patented Dec. 2, 1835.

9283X 12-2-1835

Arundus Tier
Letters Patent 741

Dec 2. 35 The schedule referred to in these letters patent and making part of
the same containing a description in the words of the
said Arundus Tier himself of his improvement in the
construction of Rail Road Car Wheels.

---

Figure 2:
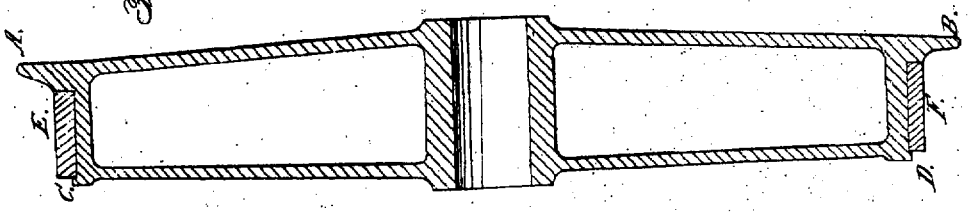
Figure 1:
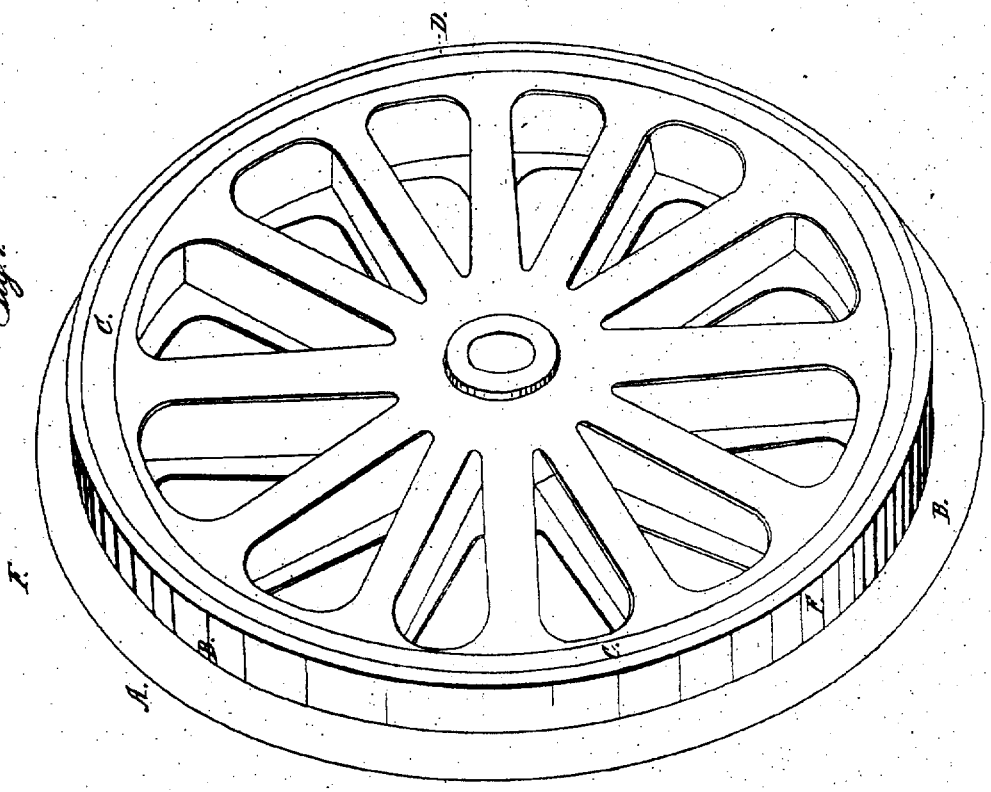

To all to whom these presents shall come;
Be it known that I Arundus Tiers of the District of
Kensington in the County of Philadelphia and State of
Pennsylvania, have invented a new and useful
improvement in the construction of wheels for Rail
Road Cars, and that the following is a full and exact
description of the construction of said wheel as invented and
improved by me. The wheel is to be made of cast iron
with a wrought iron band shrunk upon it to form the tread
of the wheel. The form & the shape of the respective parts
of the wheel which I most prefer is exhibited in the
drawing and laid down upon a scale of one fourth of
the original size. The same letters of reference are used in
each of the figures to designate similar parts. Fig 1 shows the
wheel in perspective. Fig 2 is a section supposed to be taken through

Figure 3:
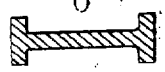

9283X the center of the wheel and perpendicular to the sides thereof.
Fig 3 is a section of one of the arms or spokes of the wheel,
In the construction of that part of the wheel which is made of
cast iron the flange A B is chilled and hardened in the
mould as it is cast in the ordinary way of chill hardening
cast iron. A small rim or flange C D is formed and cast
on the inner side or face of the wheel; this rim is intended
and used to confine the wrought iron band which is afterwards
to be put around the wheel. The wrought iron band E
is first welded together in the form of a hoop and then heat
ed until it has expanded sufficiently to pass over the small
rim or flange above referred to when it is allowed to
become cool and to contract upon the wheel as exhibited
in the drawing. This wheel possesses all the advantages of
a chilled cast iron flange with a wrought iron band or
tread and is therefore deemed to be decidedly preferable
to the cast iron wheels with wrought iron flanges, in as much
as the wrought iron flanges soon wear out especially on
roads that have frequent curves in them. This wheel
is also exempt from one of the greatest objections to the com
mon chilled cast iron wheels in being free from slits in
the hub. The small quantity of metal which requires
to be chilled in this wheel allows the wheel to be cast solid
in the hub and to render the precautionary operation of
slitting the hub entirely unnecessary. The shape of the band
as shown in fig 2 is that of a flat or oblong square, and
hence may be formed by the ordinary rolls, and con
sequently when worn out may be replaced at a small
expense. What I claim as new and as my own invention or discovery
the above described wheel, and for which I ask an exclusive right, is the man
ner of constructing wheels with chilled flanges and wrought iron band
as above described Witnesses
Benjn Hutchinson
John D. Morris Arundius Tiers
[illegible]